(12) United States Patent
Joshi et al.

(10) Patent No.: US 11,924,221 B2
(45) Date of Patent: Mar. 5, 2024

(54) SYSTEMS, METHODS, AND MEDIA FOR AUTHORIZING EXTERNAL NETWORK ACCESS REQUESTS

(71) Applicant: McAfee, LLC, San Jose, CA (US)

(72) Inventors: Harsha R. Joshi, Bangalore (IN);
Dattatraya Kulkarni, Bangalore (IN);
Srikanth Nalluri, Bangalore (IN)

(73) Assignee: McAfee, LLC, San Jose, CA (US)

( * ) Notice: Subject to any disclaimer, the term of this patent is extended or adjusted under 35 U.S.C. 154(b) by 156 days.

(21) Appl. No.: 17/060,576

(22) Filed: Oct. 1, 2020

(65) Prior Publication Data

US 2021/0314329 A1 Oct. 7, 2021

(30) Foreign Application Priority Data

Apr. 4, 2020 (IN) .............................. 202011014977

(51) Int. Cl.
*H04L 9/40* (2022.01)
(52) U.S. Cl.
CPC ........ *H04L 63/108* (2013.01); *H04L 63/0876* (2013.01); *H04L 63/20* (2013.01)
(58) Field of Classification Search
CPC ... H04L 63/108; H04L 63/0876; H04L 63/20; H04L 63/101
USPC .......................................................... 726/1
See application file for complete search history.

(56) References Cited

U.S. PATENT DOCUMENTS

| 8,244,864 | B1 | 8/2012 | Bahl |
| 8,271,774 | B1 | 9/2012 | Nachenberg et al. |
| 8,433,682 | B2 | 4/2013 | Ngo |
| 10,098,026 | B1 | 10/2018 | Lachwani et al. |
| 10,348,767 | B1* | 7/2019 | Lee ...................... H04L 63/0236 |
| 10,425,419 | B2* | 9/2019 | Jayawardena ...... H04L 63/0892 |
| 10,511,602 | B2 | 12/2019 | Siwal et al. |
| 10,623,390 | B1* | 4/2020 | Rosenhouse ............ H04L 67/10 |
| 10,742,396 | B2 | 8/2020 | Suthar et al. |
| 10,764,294 | B1* | 9/2020 | Wasiq ..................... H04L 63/10 |
| 10,841,271 | B2 | 11/2020 | Karkhanis |
| 11,146,534 | B1 | 10/2021 | Lewin et al. |

(Continued)

FOREIGN PATENT DOCUMENTS

| EP | 2020140 | 8/2009 |
| WO | WO2007055915 | 5/2017 |
| WO | WO2018183542 | 10/2018 |

OTHER PUBLICATIONS

Extended European Search Report dated Aug. 30, 2021 in EP Patent Application No. 21166629.2, pp. 1-8.

(Continued)

*Primary Examiner* — Kambiz Zand
*Assistant Examiner* — Aubrey H Wyszynski
(74) *Attorney, Agent, or Firm* — Byrne Poh LLP

(57) ABSTRACT

Mechanisms for authorizing requests to access a resource are provided, the methods comprising: receiving a request to access the resource at a hardware processor from an Internet Protocol (IP) address; determining whether a rule applies to the request to access the resource; in response to determining that a rule does not apply to the request to access the resource, sending a request for authorization; receiving a response to the request for authorization; and in response to the response to the request for authorization indicating that access is authorized, providing a connection to the resource.

18 Claims, 4 Drawing Sheets

(56) References Cited

U.S. PATENT DOCUMENTS

| | | | |
|---|---|---|---|
| 11,336,613 B2 | 5/2022 | Karkhanis | |
| 2004/0075683 A1* | 4/2004 | Savage | G06F 16/252 |
| | | | 715/741 |
| 2011/0161259 A1 | 6/2011 | Ngo | |
| 2012/0227093 A1* | 9/2012 | Shatzkamer | H04L 69/161 |
| | | | 726/4 |
| 2015/0249672 A1* | 9/2015 | Burns | G06F 21/629 |
| | | | 726/4 |
| 2015/0312236 A1* | 10/2015 | Ducker | H04L 63/0876 |
| | | | 726/4 |
| 2017/0111336 A1 | 4/2017 | Davis et al. | |
| 2017/0353462 A1 | 12/2017 | Siwal et al. | |
| 2019/0268342 A1 | 8/2019 | Rossman et al. | |
| 2019/0380031 A1 | 12/2019 | Suthar et al. | |
| 2020/0028821 A1 | 1/2020 | Weisshaupt et al. | |
| 2021/0306296 A1* | 9/2021 | Livoti | H04L 61/5014 |
| 2021/0314302 A1 | 10/2021 | Lewin et al. | |

OTHER PUBLICATIONS

Extended European Search Report dated Nov. 11, 2022 in EP Patent Application No. 20 772 939.3, pp. 1-8.
International Preliminary Report on Patentability dated Sep. 30, 2021 in International Patent Application No. PCT/US2020/022737, pp. 1-7.
International Search Report and Written Opinion dated Jul. 2, 2020 in International Patent Application No. PCT/US2020/022737, pp. 1-10.
Notice of Allowance dated Jan. 19, 2023 in U.S. Appl. No. 16/354,932, pp. 1-33.
Office Action dated Jan. 4, 2022 in U.S. Appl. No. 16/354,932, pp. 1-29.
Office Action dated Jun. 25, 2021 in U.S. Appl. No. 16/354,932, pp. 1-12.
Office Action dated Jun. 27, 2022 in U.S. Appl. No. 16/354,932, pp. 1-34.

* cited by examiner

SYSTEMS, METHODS, AND MEDIA FOR AUTHORIZING EXTERNAL NETWORK ACCESS REQUESTS

CROSS-REFERENCE TO RELATED APPLICATION

This application claims the benefit of India Patent Application No. 202011014977, filed Apr. 4, 2020, which is hereby incorporated by reference herein in its entirety.

BACKGROUND

Many Internet of Things (IoT) devices sold today provide various useful functionalities over the Internet without using a centralized subscription server. For example, streaming video from some home security cameras can be accessed by mobile phones or laptop computers from locations remote from the cameras directly over the Internet.

In some cases, minimal documentation is provided describing how to connect a mobile phone or laptop to an IoT device through the Internet using a port forwarding technique on the user's home gateway or router. The documentation typically asks a user to open a port on their home gateway or router and associate that port with an IoT device. Many users are likely ignorant about the security ramifications of opening a port on their home gateway or router and many probably end up leaving the default username and password on the gateway or router after port forwarding has been set up. In many cases, the forwarded port numbers are also unchanged. Any hacker having access to the public IP address of a user can easily scan for the open ports and try the default username and password to gain access to services and/or devices inside the home network.

Thus, more secure solutions for allowing users to provide functionalities of IoT devices over the Internet without using a centralized subscription server are desirable.

SUMMARY

In accordance with some embodiments, systems, methods, and media for authorizing external network access requests are provided.

In some embodiments, methods for authorizing requests to access a resource are provided, the methods comprising: receiving a request to access the resource at a hardware processor from an Internet Protocol (IP) address; determining whether a rule applies to the request to access the resource; in response to determining that a rule does not apply to the request to access the resource, sending a request for authorization; receiving a response to the request for authorization; and in response to the response to the request for authorization indicating that access is authorized, providing a connection to the resource. In some of these embodiments, the hardware processor is part of one of a gateway and a router. In some of these embodiments, the request for authorization is sent to an administrator device via an authorization server. In some of these embodiments, the request for authorization is sent directly to an administrator device. In some of these embodiments, the method further comprises blocking access to the resource by the IP address after a period of time from the response to the request for authorization indicating that access is authorized. In some of these embodiments, the method further comprises adding the IP address to a whitelist.

In some embodiments, systems for authorizing requests to access a resource are provided, the systems comprising: a memory; and a hardware processor coupled to the memory and configured to: receive a request to access the resource from an Internet Protocol (IP) address; determine whether a rule applies to the request to access the resource; in response to determining that a rule does not apply to the request to access the resource, send a request for authorization; receive a response to the request for authorization; and in response to the response to the request for authorization indicating that access is authorized, provide a connection to the resource. In some of these embodiments, the hardware processor is part of one of a gateway and a router. In some of these embodiments, the request for authorization is sent to an administrator device via an authorization server. In some of these embodiments, the request for authorization is sent directly to an administrator device. In some of these embodiments, the hardware processor is further configured to block access to the resource by the IP address after a period of time from the response to the request for authorization indicating that access is authorized. In some of these embodiments, the hardware processor is further configured to add the IP address to a whitelist.

In some embodiments, non-transitory computer-readable media containing computer executable instructions that, when executed by a processor, cause the processor to perform a method for authorizing requests to access a resource are provided, the method comprising: receiving a request to access the resource from an Internet Protocol (IP) address; determining whether a rule applies to the request to access the resource; in response to determining that a rule does not apply to the request to access the resource, sending a request for authorization; receiving a response to the request for authorization; and in response to the response to the request for authorization indicating that access is authorized, providing a connection to the resource. In some of these embodiments, the processor is part of one of a gateway and a router. In some of these embodiments, the request for authorization is sent to an administrator device via an authorization server. In some of these embodiments, the request for authorization is sent directly to an administrator device. In some of these embodiments, the method further comprises blocking access to the resource by the IP address after a period of time from the response to the request for authorization indicating that access is authorized. In some of these embodiments, the method further comprises adding the IP address to a whitelist.

DETAILED DESCRIPTION

In accordance with some embodiments, mechanisms (which can include systems, methods, and media) for authorizing external network access requests are provided. Generally speaking, in some embodiments, these mechanisms first detect access requests from the Internet to a resource inside a home network at a home gateway. Then, the mechanisms forward the access request to a trusted administrator device (which may be inside or outside the home network). Next, a user of the administrator device can then authorize the access request, reject the request, or allow the access for a specified amount of time beyond which the access is automatically closed. Finally, the home gateway can authorize the access request, reject the request, or allow the access for a specified amount of time beyond which the access is automatically closed. More particular details are provided below.

Figure 1:
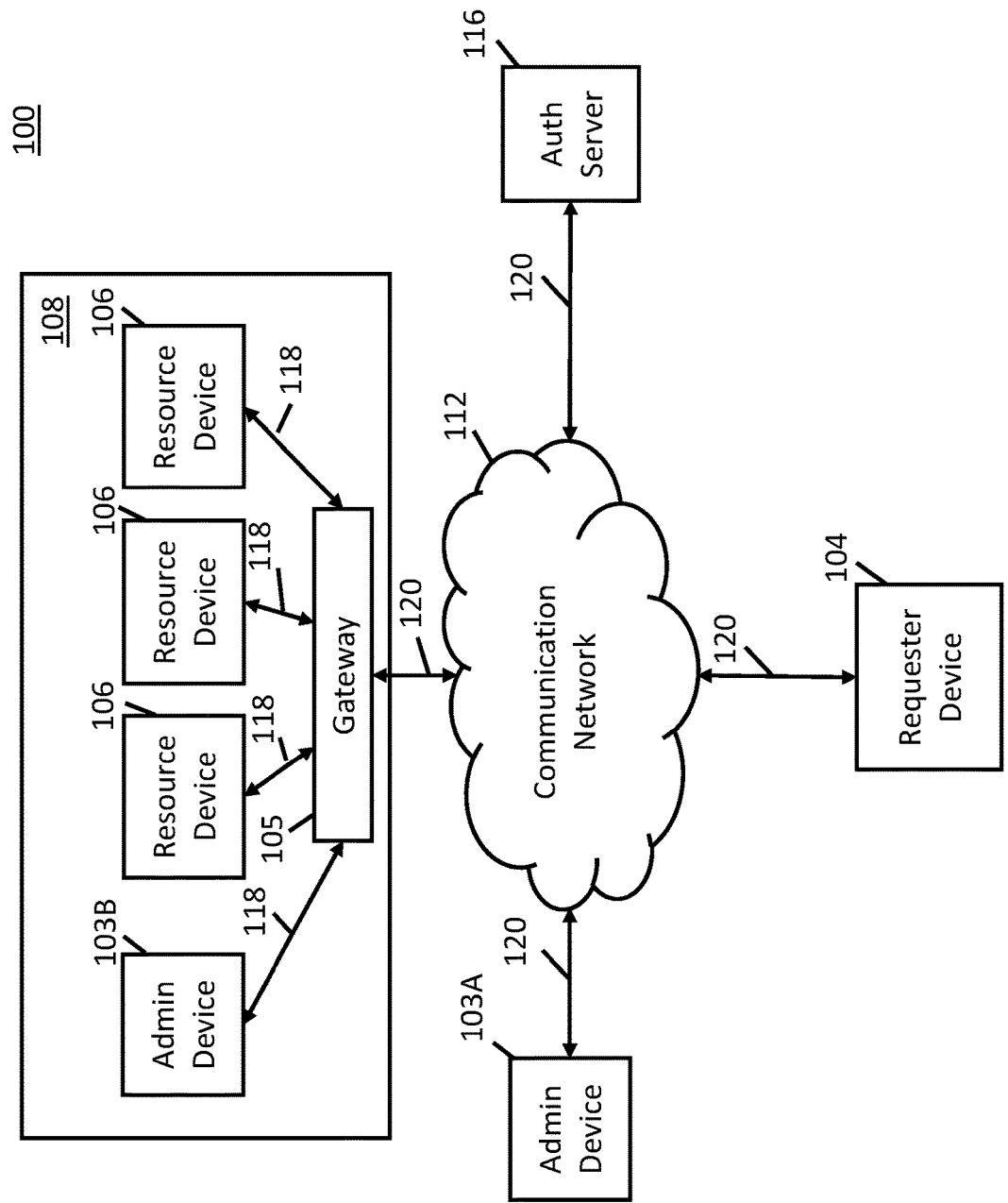
FIG. 1 shows an example of hardware that can be used in accordance with some embodiments.

Turning to FIG. 1, an example 100 of hardware that can be used in accordance with some embodiments of the disclosed subject matter is shown. As illustrated, hardware 100 can include a local area network (LAN) 108, an administrator device 103A, a communication network 112, an authorization server 116, and a requester device 104. As also shown in FIG. 1, in some embodiments, LAN 108 can include an administrator device 103B, resource devices 106, and a gateway 105.

Although particular numbers of particular devices are illustrated in FIG. 1, any suitable number(s) of each device shown, and any suitable additional or alternative devices, can be used in some embodiments. For example, one or more additional devices, such as servers, computers, routers, networks, printers, etc., can be included in LAN 108 in some embodiments. As another example, in some embodiments, authorization server 116 can be omitted (in which case functions described herein as being performed by the authorization server can be performed by the gateway in some embodiments).

Administrator devices 103A and 103B can be any suitable one or more devices used by an authorized user to authorize one or more requests to access one or more resources of resource devices 106 by a requester device 104. For example, in some embodiments, administrator devices 103A and 103B can be desktop computers, laptop computers, tablet computers, smart phones, smart speakers, smart displays, and/or any other suitable device that can be used to authorize one or more requests to access one or more resources of resource devices 106 by requester device 104. Although two different administrator devices 103A (outside LAN 108) and 103B (inside LAN 108) are shown in FIG. 1, these two devices can be the same device just moved from one location to the other in some embodiments. In some embodiments, administrator devices 103A and 103B can perform corresponding portions of the processes illustrated in, and described in connection with, FIGS. 3 and 4.

Resource devices 106 can be any suitable devices in LAN 108 in some embodiments. For example, in some embodiments, resource devices 106 can be desktop computers, laptop computers, tablet computers, smart phones, cameras, digital video recorders, smart thermostats, smart door bells, smart appliances, servers, routers, smart fire alarms, printers, smart speakers, smart displays, Internet of Things (IoT) devices, and/or any other suitable device(s). In some embodiments, resource devices 106 can perform corresponding portions of the process illustrated in, and described in connection with, FIG. 4.

Gateway 105 can be any suitable device for connecting other devices in LAN 108 (such as administrator device 103B and resource devices 106) to devices and/or networks outside LAN 108 in some embodiments. In some embodiments, gateway 105 can perform corresponding portions of the processes illustrated in, and described in connection with, FIGS. 3 and 4. In some embodiments, gateway 105 can monitor traffic passing through it in any direction and block traffic based on selections made on administrator device 103A or 103B. In some embodiments, gateway 105 may provide a firewall function, a routing function, and/or any other suitable function(s).

Administrator device 103B and resource devices 106 can be connected by one or more communications links 118 to gateway 105 in some embodiments. The communications links can be any communications links suitable for communicating data among administrator device 103B, resource devices 106, and gateway 105, such as network links, dial-up links, wireless links, hard-wired links, routers, switches, any other suitable communications links, or any suitable combination of such links, in some embodiments.

Communication network 112 can be any suitable combination of one or more wired and/or wireless networks in some embodiments. For example, in some embodiments, communication network 112 can include any one or more of the Internet, a mobile data network, a satellite network, a local area network, a wide area network, a telephone network, a cable television network, a WiFi network, a WiMax network, and/or any other suitable communication network.

In some embodiments, communication network 112 and the devices connected to it can form or be part of a wide area network (WAN).

Authorization server 116 can be any suitable server for associating administrator device(s) 130A and 103B and gateway 105. In some embodiments, authorization server 116 can perform corresponding portions of the process illustrated in, and described in connection with, FIG. 4.

Requester device 104 can be any suitable device for requesting access to one or more resource devices 106 in LAN 108 and accessing resources (such as data, programs, media content, and/or any other suitable resource) from the one or more resource devices. For example, in some embodiments, requester device 104 can be a desktop computer, a laptop computer, a tablet computer, a smart phone, a smart speaker, a smart display, and/or any other suitable device that can be used to request access to one or more resource devices 106 in LAN 108 and access resources (such as data, programs, media content, and/or any other suitable resource) from the one or more resource devices. In some embodiments, requester device 104 can perform corresponding portions of the process illustrated in, and described in connection with, FIG. 4.

Gateway 105, administrator device 103A, authorization server 116, and requester device 104 can be connected by one or more communications links 120 to communication network 112. These communications links can be any communications links suitable for communicating data among gateway 105, administrator device 103A, authorization server 116, requester device 104, and communication network 112, such as network links, dial-up links, wireless links, hard-wired links, routers, switches, any other suitable communications links, or any suitable combination of such links.

Figure 2:
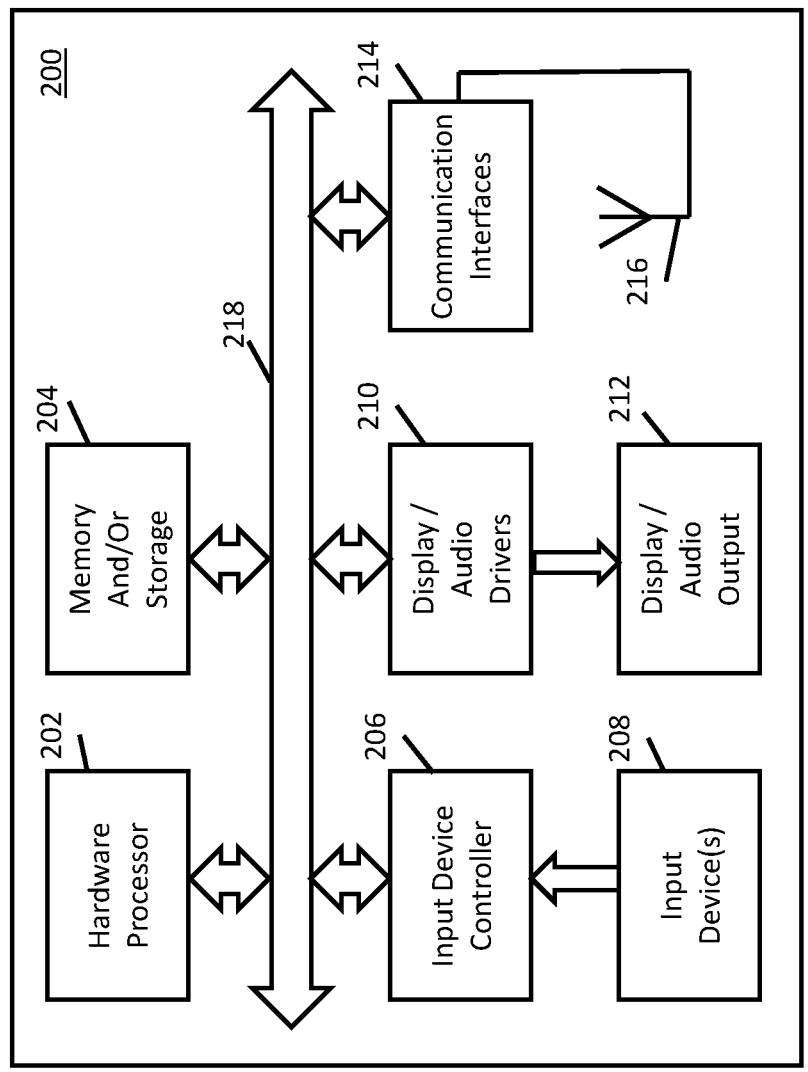
FIG. 2 shows an example of more particular hardware that can be used for certain of the components shown in FIG. 1 in accordance with some embodiments.

Administrator device(s) 103A and 103B, resource devices 106, gateway 105, authorization server 116, and requester device 104 can be implemented using any suitable hardware in some embodiments. For example, in some embodiments, administrator device(s) 103A and 103B, resource devices 106, gateway 105, authorization server 116, and requester device 104 can be implemented using any suitable general-purpose computer or special-purpose computer(s). For example, gateway 105 can be implemented using a special-purpose computer. Any such general-purpose computer or special-purpose computer can include any suitable hardware. For example, as illustrated in example hardware 200 of FIG. 2, such hardware can include hardware processor 202, memory and/or storage 204, an input device controller 206, an input device 208, display/audio drivers 210, display and audio output circuitry 212, communication interface(s) 214, an antenna 216, and a bus 218.

Hardware processor 202 can include any suitable hardware processor, such as a microprocessor, a micro-controller, digital signal processor(s), dedicated logic, and/or any other suitable circuitry for controlling the functioning of a general-purpose computer or a special purpose computer in some embodiments.

Memory and/or storage 204 can be any suitable memory and/or storage for storing programs, data, and/or any other suitable information in some embodiments. For example, memory and/or storage 204 can include random access memory, read-only memory, flash memory, hard disk storage, optical media, and/or any other suitable memory.

Input device controller 206 can be any suitable circuitry for controlling and receiving input from input device(s) 208 in some embodiments. For example, input device controller 206 can be circuitry for receiving input from an input device 208, such as a touch screen, from one or more buttons, from a voice recognition circuit, from a microphone, from a camera, from an optical sensor, from an accelerometer, from a temperature sensor, from a near field sensor, and/or any other type of input device.

Display/audio drivers 210 can be any suitable circuitry for controlling and driving output to one or more display/audio output circuitries 212 in some embodiments. For example, display/audio drivers 210 can be circuitry for driving one or more display/audio output circuitries 212, such as an LCD display, a speaker, an LED, or any other type of output device.

Communication interface(s) 214 can be any suitable circuitry for interfacing with one or more communication networks, such as network 112 as shown in FIG. 1. For example, interface(s) 214 can include network interface card circuitry, wireless communication circuitry, and/or any other suitable type of communication network circuitry.

Antenna 216 can be any suitable one or more antennas for wirelessly communicating with a communication network in some embodiments. In some embodiments, antenna 216 can be omitted when not needed.

Bus 218 can be any suitable mechanism for communicating between two or more components 202, 204, 206, 210, and 214 in some embodiments.

Any other suitable components can additionally or alternatively be included in hardware 200 in accordance with some embodiments.

Figure 3:
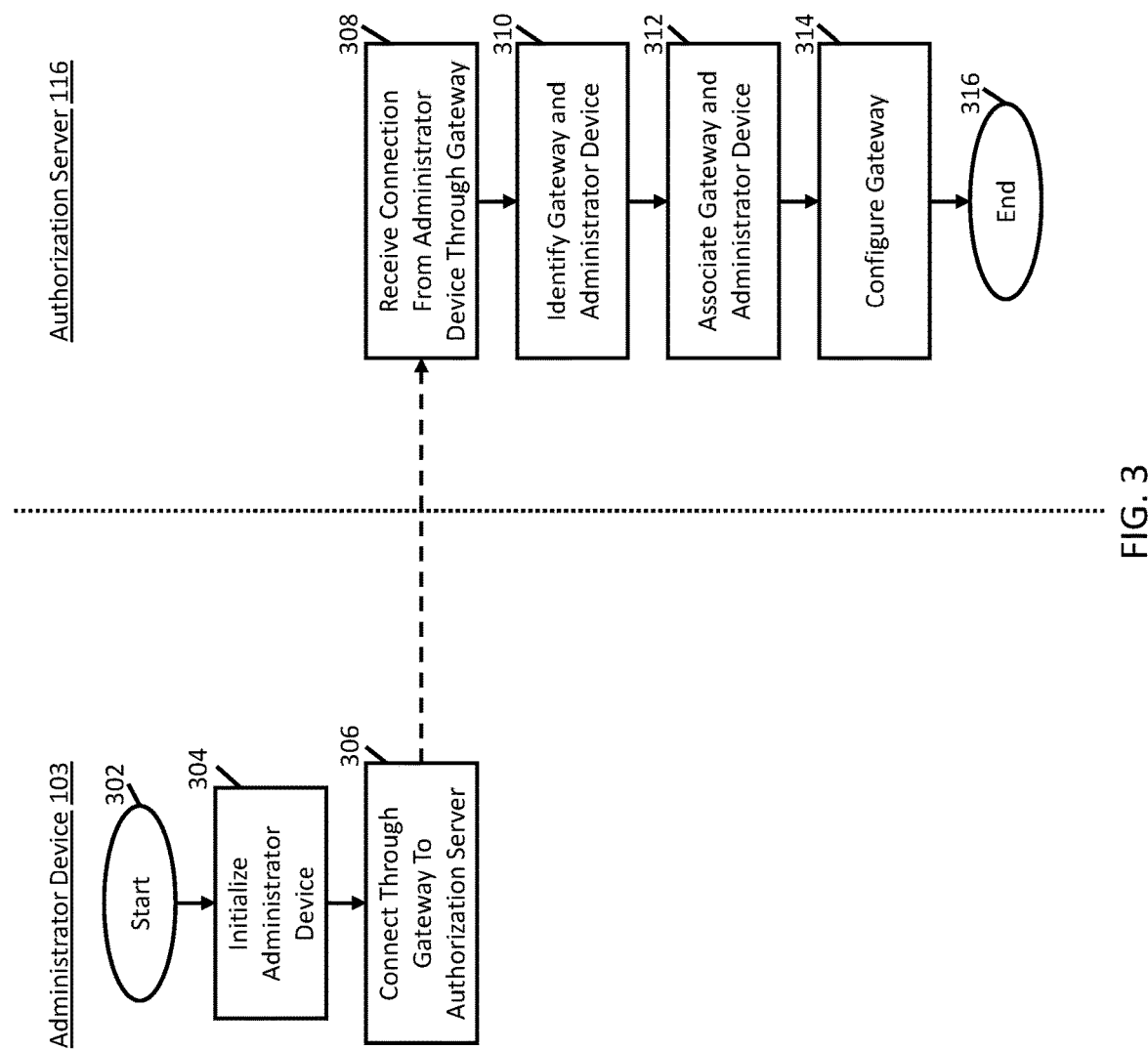
FIG. 3 shows an example of a process for configuring an administrator device, a gateway, and an authorization server in accordance with some embodiments.

Referring to FIG. 3, an example 300 of a process for setting up a gateway, an authorization server, and an administrator device in accordance with some embodiments is shown. For example, in some embodiments, process 300 can be used to set up a gateway 105 (FIG. 1), an administrator device (e.g., administrator device 103A and/or administrator device 103B (FIG. 1)), and an authorization server 116 (FIG. 1).

In some embodiments, parts of process 300 and process 400 (described in connection with FIG. 4 below) corresponding to administrator device 103A and/or 103B can be part of an app that is executed on administrator device 103A and/or 103B.

After process 300 begins, at 302, the process can initialize an administrator device at 304. Any suitable initialization can be performed in any suitable manner in some embodiments. In some embodiments, process 300 can initialize the administrator device by configuring a connection to a gateway, such as gateway 105 of FIG. 1. More particularly, for example, process 300 can request an internet protocol (IP) address from the gateway and provide credentials (e.g., a password) to access the gateway when the administrator device is inside LAN 108.

Next, at 306 and 308, process 300 can connect through the gateway to an authorization server, such as authorization server 116 (FIG. 1).

Then, at 310, process 300 can identify the gateway and the administrator device. The gateway and administrator device can be identified in any suitable manner. For example, in some embodiments, upon an initial connection (or each connection) between the administrator device and the authorization server, the authorization server can require a user of the administrator device to enter any suitable credentials (e.g., such as a user id and a password) and then provide to the administrator device an access token that can subsequently be used to identify the administrator device. As another example, in some embodiments, upon an initial connection (or each connection) between the administrator device and the authorization server via the gateway, the authorization server can store a unique key (or access token) on the gateway, and the unique key (or access token) can be used by the gateway to authenticate itself with the authorization server during subsequent connections and communications.

At 312, process 300 can associate the gateway and administrator device. This association can be performed in any suitable manner. For example, in some embodiments, process 300 can associate the unique key of the gateway with the access token of the administrator device.

Then, at 314, process can configure the gateway in some embodiments. The gateway can be configured in any suitable manner in some embodiments. For example, in some embodiments, the gateway can be configured by providing any previously configured or default rules to the gateway (e.g., by configuring iptables firewall rules in the gateway).

Finally, process 300 can end at 314.

Figure 4:
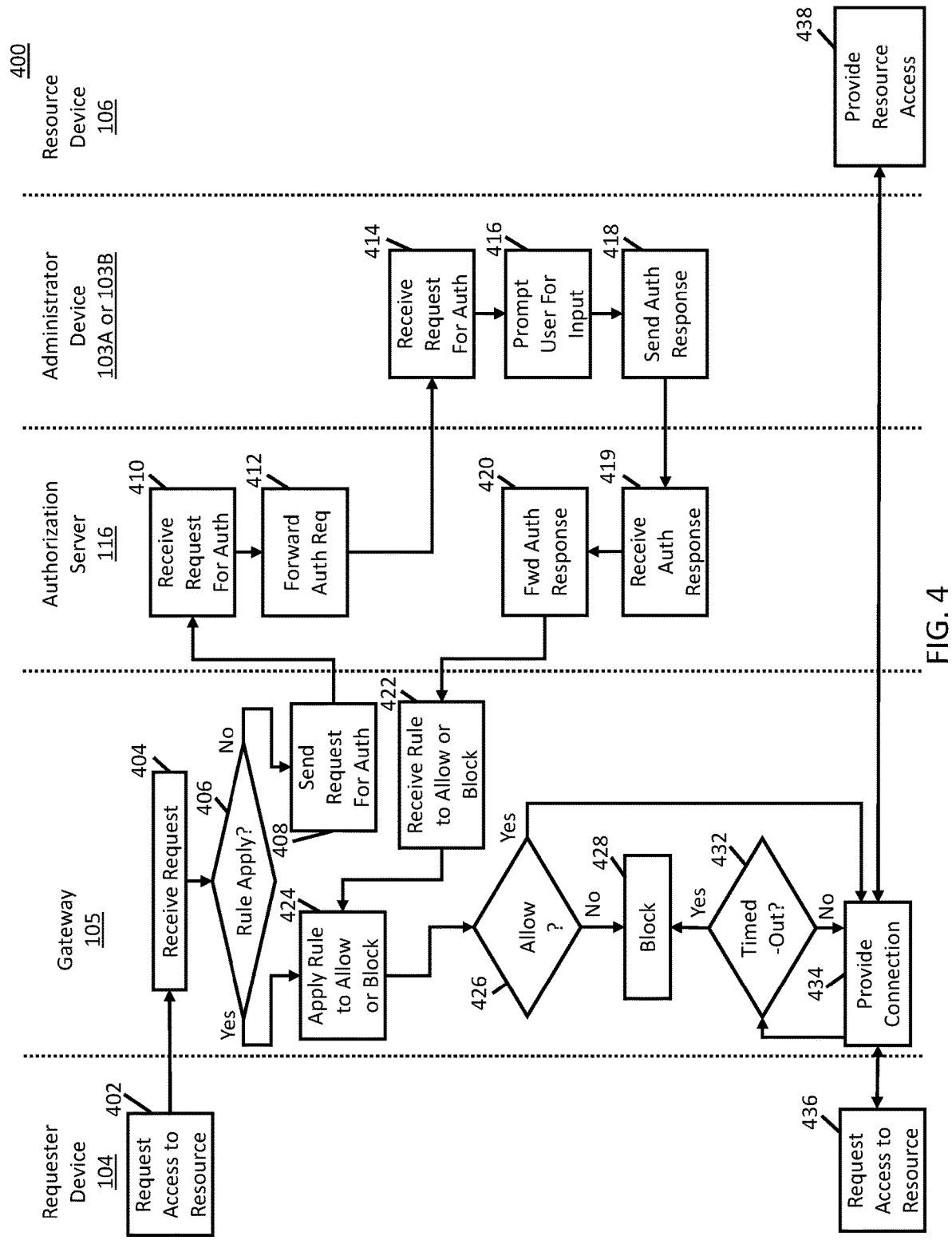
FIG. 4 shows an example of a process for providing access to a resource from a requester device in accordance with some embodiments.

Turning to FIG. 4, an example 400 of a process for authorizing or blocking connections in accordance with some embodiments is shown.

As illustrated, initially a request to access a resource (e.g., provided by resource device 106) is made at 402 by a requester device (e.g., requester device 104) to a gateway (e.g., gateway 105). This request can be made and received in any suitable manner in some embodiments. For example, in some embodiments, this request can be made by making a request to the external (WAN) IP address of the gateway and a port number corresponding to the resource. In some embodiments, the gateway can be configured to have any suitable number of ports each configured to provide a resource from a resource device (e.g., a resource device 106).

Next, at 406, process 400 can determine whether one or more rules apply to the request received at 404. This determination can be made in any suitable manner in some embodiments. For example, in some embodiments, the IP address and source port of the requester device and the port number associated with the request can be compared to one or more rules, blacklists (a list of items to always be blocked), whitelists (a list of items to always be allowed), iptables firewall rules, databases, etc. to determine if there are any instructions on how treat the request.

If it is determined at 406 that a rule does not apply, then at 408, process 400 can drop the packets associated with the request, and send a request for authorization to the administrator device (e.g., administrator device 103A or 103B of FIG. 1) via the authorization server (e.g., authorization server 116 of FIG. 1) (at 410 and 412) and the request can be received at the administrator device at 414. This request for authorization can be sent in any suitable manner in some embodiments. For example, in some embodiments, the gateway can send at 408 a request identifying the IP address of the requestor device, the port number associated with the request sent at 402, a protocol associated with the request sent at 402 and the associated resource, an identifier of the resource device of the associated resource, and the unique key used to authenticate the gateway with the authorization server (and stored on the gateway at 310 of FIG. 3). The request sent at 408 can then be received by the authorization server and augmented to include an identifier of a location corresponding to the requester device (which the authorization server can determine based on the IP address of the authorization server in some embodiments) (in some embodiments, the identifier of the location can be determined and added to the request by the gateway). Next, at 412, process 400 can forward the request for authorization request at 412 and the request can be received at 414. (In embodiments in which the authorization server is omitted, the gateway can send the request for authorization directly to the administrator device).

At 416, process 400 can present options to a user for handling the request for authorization and receive a selection of how to handle the request. Any suitable options can be presented and the options can be selected in an suitable manner. For example, in some embodiments, the options can be presented as buttons on a user interface of the administrator device and the user can select an option by pressing a corresponding button. In some embodiments, the options can include one or more of the following:

- Block the request from accessing the resource and add the IP address of the requester device and the port associated with the request to access the resource to a blacklist;
- Block the request from accessing the resource for a period of time and ask the user how to handle new requests from the IP address to access the resource after the period of time;
- Allow the request to access the resource for a period of time and ask the user how to handle new requests from the IP address to access the resource after the period of time; and
- Allow the request to access the resource, and add the IP address of the requester device and the port associated with the request to access the resource to a whitelist.

Next, at 418, process 400 can send a response to the request for authorization via the authorization server (at 419 and 420) and the response can be received at the gateway (at 422). In some embodiments, this response can be treated as a rule to be applied at the gateway. (In embodiments in which the authorization server is omitted, the administrator device can send the response directly to the gateway).

Then, at 424, after receiving the response to be treated as a rule at 422 or determining at 406 that a rule applies, process 400 can apply the rule to allow or block the request to access the resource received at 404. This rule can be applied in any suitable manner in some embodiments. For example, a rule can be configured to:

- Permanently block the request from accessing the resource;
- Block the request from accessing the resource for a period of time and ask a user of an administrator device how to handle new requests from the IP address to access the resource after the period of time;
- Allow the request to access the resource for a period of time and ask a user of an administrator device how to handle new requests from the IP address to access the resource after the period of time; and
- Permanently allow the request to access the resource.

At 426, process 400 can then determine whether to allow the request to access the resource received at 404. This determination can be made in any suitable manner. For example, in some embodiments, this determination can be made by determining that a rule applies to the requester device's IP address and the port corresponding to the request for access, and that the rule states to block the connection permanently or during the current period of time. As another example, in some embodiments, this determination can be made by determining that a rule applies to the requester device's IP address and the port corresponding to the request for access, and that the rule states to allow the connection permanently or during the current period of time.

If process 400 determines at 426 that the request for access is to not be allowed, then at 428, process 400 can block the request. The request can be blocked in any suitable manner. For example, the gateway (e.g., gateway 105) can block subsequent requests to access the resource by dropping all packets associated with such subsequent requests.

Otherwise, if process 400 determines at 426 that the request for access is to be allowed, then process 400 can branch to 434 at which it will provide a connection between a new request to access the resource at 436 and the resource at 438. The connection can be provided at 434 in any suitable manner. For example, in some embodiments, the gateway can use port forwarding to forward requests made to the IP address of the gateway and the port of the resource to an IP address and port of the resource device associated with the resource.

Periodically while providing the connection at 434, process 400 can determine whether the period for allowing the request for access has timed-out at 432. This determination can be made in any suitable manner in some embodiments. For example, in some embodiments, process 400 can determine that the period for allowing the request for access has not timed-out based on a rule indicating that the connection is permanently allowed or based on an indicated period of allowance having not yet expired. As another example, in some embodiments, this determination can determine that the period for allowing the request for access has timed-out based on an indicated period of allowance having expired.

If process 400 determines at 432 that the period for allowing the request for access has timed-out, then process 400 can branch to 428 and proceed as described above.

Otherwise, if process 400 determines at 432 that the period for allowing the request for access has not timed-out, then process 400 can branch back to 434 and proceed as described above.

As noted above, various communications take place between the gateway and the authorization server and between the authorization server and the administrator device. Any of these communications can be implemented in a push model or a pull model. That is, in a push model, a sender can send a communication to a recipient at any time, and in a pull model a sender will hold a communication at an output buffer and wait for the recipient to retrieve the communication.

It should be understood that at least some of the above described blocks of the processes of FIGS. 3 and 4 can be executed or performed in any order or sequence not limited to the order and sequence shown in and described in the figures. Also, some of the above blocks of the processes of FIGS. 3 and 4 can be executed or performed substantially simultaneously where appropriate or in parallel to reduce latency and processing times. Additionally or alternatively, some of the above described blocks of the processes of FIGS. 3 and 4 can be omitted.

In some embodiments, any suitable computer readable media can be used for storing instructions for performing the functions and/or processes described herein. For example, in some embodiments, computer readable media can be transitory or non-transitory. For example, non-transitory computer readable media can include media such as non-transitory magnetic media (such as hard disks, floppy disks, and/or any other suitable magnetic media), non-transitory optical media (such as compact discs, digital video discs, Blu-ray discs, and/or any other suitable optical media), non-transitory semiconductor media (such as flash memory, electrically programmable read-only memory (EPROM), electrically erasable programmable read-only memory (EEPROM), and/or any other suitable semiconductor media), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/or any suitable intangible media.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for authorizing requests to access a resource that is part of a local area network, comprising:
    receiving a request to access the resource that is part of the local area network at a hardware processor that is also part of the local area network from an Internet Protocol (IP) address that is outside the local area network;
    determining whether a rule applies to the request to access the resource;
    in response to determining that a rule does not apply to the request to access the resource, sending a request for authorization;
    receiving a response to the request for authorization, wherein the response to the request for authorization is based on a manual entry of a user; and
    in response to the response to the request for authorization indicating that access is authorized, providing a connection to the resource.

2. The method of claim 1, wherein the hardware processor is part of one of a gateway and a router that is part of the local area network.

3. The method of claim 1, wherein the request for authorization is sent to an administrator device via an authorization server.

4. The method of claim 1, wherein the request for authorization is sent directly to an administrator device.

5. The method of claim 1, further comprising:
    blocking access to the resource by the IP address after a period of time from the response to the request for authorization indicating that access is authorized.

6. The method of claim 1, further comprising:
    adding the IP address to a whitelist.

7. A system for authorizing requests to access a resource that is part of a local area network, comprising:
    a memory; and
    a hardware processor that is coupled to the memory, that is also part of the local area network, and that is and configured to:
        receive a request to access the resource that is part of the local area network from an Internet Protocol (IP) address that is outside the local area network;
        determine whether a rule applies to the request to access the resource;
        in response to determining that a rule does not apply to the request to access the resource, send a request for authorization;
        receive a response to the request for authorization, wherein the response to the request for authorization is based on a manual entry of a user; and
        in response to the response to the request for authorization indicating that access is authorized, provide a connection to the resource.

8. The system of claim 7, wherein the hardware processor is part of one of a gateway and a router that is part of the local area network.

9. The system of claim 7, wherein the request for authorization is sent to an administrator device via an authorization server.

10. The system of claim 7, wherein the request for authorization is sent directly to an administrator device.

11. The system of claim 7, wherein the hardware processor is further configured to:
    block access to the resource by the IP address after a period of time from the response to the request for authorization indicating that access is authorized.

12. The system of claim 7, wherein the hardware processor is further configured to:
    add the IP address to a whitelist.

13. A non-transitory computer-readable medium containing computer executable instructions that, when executed by a processor that is part of a local area network, cause the processor to perform a method for authorizing requests to access a resource that is part of the local area network, the method comprising:
    receiving a request to access the resource that is part of the local area network from an Internet Protocol (IP) address that is outside the local area network;
    determining whether a rule applies to the request to access the resource;
    in response to determining that a rule does not apply to the request to access the resource, sending a request for authorization;
    receiving a response to the request for authorization, wherein the response to the request for authorization is based on a manual entry of a user; and
    in response to the response to the request for authorization indicating that access is authorized, providing a connection to the resource.

14. The non-transitory computer-readable medium of claim 13, wherein the processor is part of one of a gateway and a router that is part of the local area network.

15. The non-transitory computer-readable medium of claim 13, wherein the request for authorization is sent to an administrator device via an authorization server.

16. The non-transitory computer-readable medium of claim 13, wherein the request for authorization is sent directly to an administrator device.

17. The non-transitory computer-readable medium of claim 13, wherein the method further comprises:
   blocking access to the resource by the IP address after a period of time from the response to the request for authorization indicating that access is authorized.

18. The non-transitory computer-readable medium of claim 13, wherein the method further comprises:
   adding the IP address to a whitelist.

* * * * *